F. M. GIBBS.
MANURE DISTRIBUTER.
APPLICATION FILED MAR. 6, 1912.
1,057,341.
Patented Mar. 25, 1913.
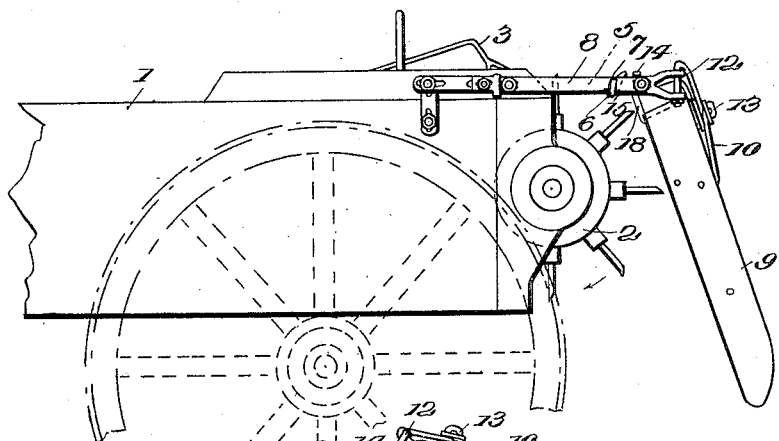
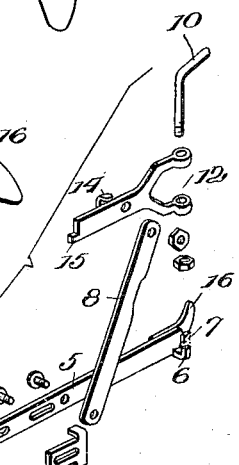
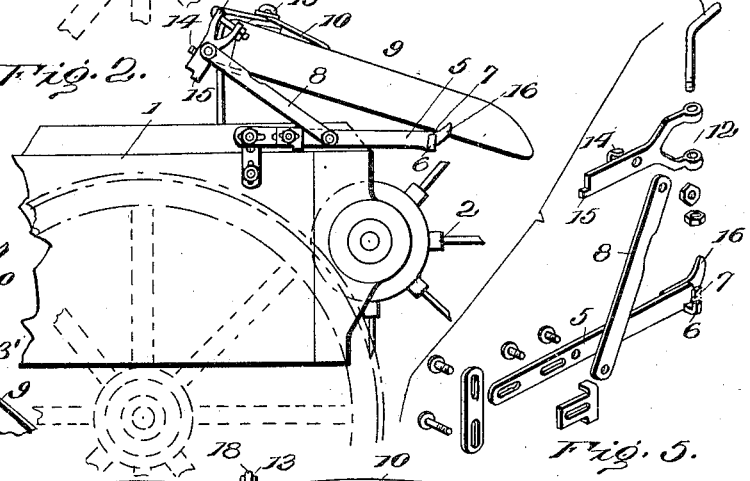
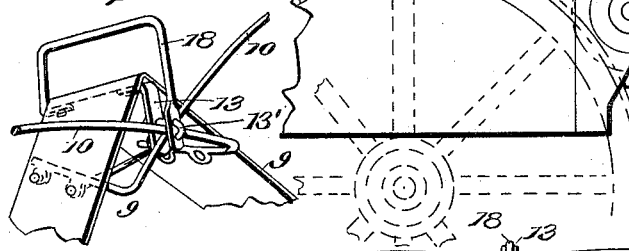
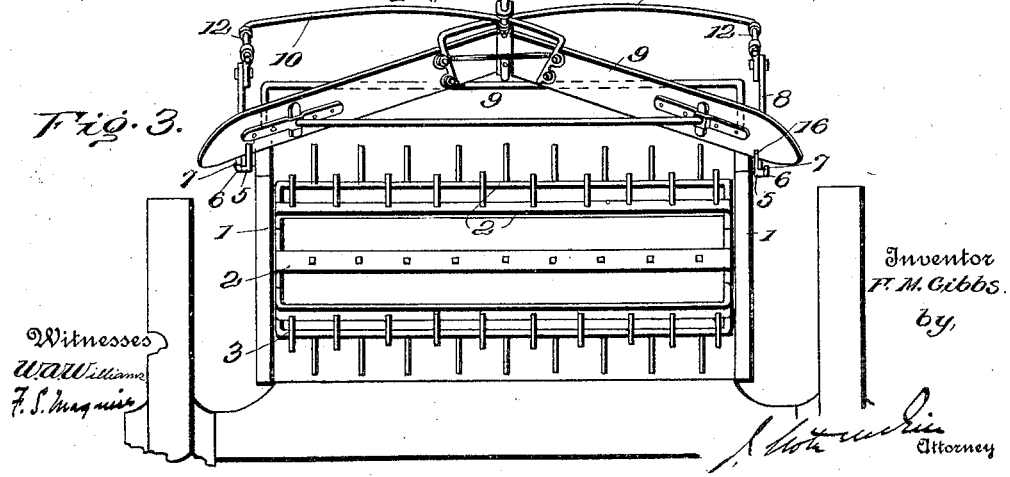

UNITED STATES PATENT OFFICE.

FREDERICK M. GIBBS, OF MILLTOWN, INDIANA.

MANURE-DISTRIBUTER.

1,057,341.

Specification of Letters Patent.

Patented Mar. 25, 1913.

Application filed March 6, 1912. Serial No. 681,904.

*To all whom it may concern:*

Be it known that I, FREDERICK M. GIBBS, of Milltown, in the county of Crawford and State of Indiana, have invented certain new and useful Improvements in Manure-Distributers; and I do hereby declare the following to be a full, clear, and exact description of the invention, such as will enable others skilled in the art to which it appertains to make and use the same.

The primary object of my invention is to provide an improved simple and highly efficient spreading device for manure distributers, through the agency of which fertilizer may be spread over a greater space than usual, thus enabling more territory to be covered in less time, and preventing the wheel tracks coming together and causing the fertilizer to clog. And a further object is to allow the attachment to be readily swung out of operative position when but a narrow strip of ground is to be covered.

The invention will be hereinafter fully set forth and particularly pointed out in the claims.

In the accompanying drawings, Figure 1 shows a portion of a standard manure distributer with my device attached and in operative position. Fig. 2 is a similar view showing the attachment out of use. Fig. 3 is a rear end view. Fig. 4 is a fragmentary view of the spreader. Fig. 5 shows details in perspective.

Referring to the drawings, 1 designates a manure distributer having a rotary feeder 2, and rake 3 which acts in conjunction with the feeder, all of these parts being of known construction.

5, 5, are horizontally disposed arms secured to the sides of the distributer about on a plane with the top of the rotary feeder. Each arm 5 at its free end has a laterally projecting lug 6 and a shoulder 7 on its under side. A link 8 is pivoted to each fixed arm 5 and is supported by lug 6 when in a horizontal position.

The spreader 9 is of inverted V-shape, and is located centrally of the feeder. The side members of the spreader are of such length that their free ends project to within a short distance of the carrying wheels of the machine. The lower ends of said members are farther removed from the vertical plane of the feeder than the upper ends, thereby insuring a spread of fertilizer over the entire length of the side members. The downward inclination of the side members of the spreader causes a portion of the fertilizer to be thrown beyond the wheels, so that in the next trip of the distributer the wheels will not track down the spread fertilizer of the previous trip. The spreader is connected to links 8 by means of two crossed arms 10 and two brackets 12. The arms 10 are fastened to the inner sides of the spreader members and are supported by a fixed bracket 13 attached to the spreader at its vertex, and to which they are secured by a U-bolt 13', or in any other preferred manner. These arms extend in opposite directions above the spreader and their free ends are downwardly bent and pass through eyes in the outer ends of the brackets 12, which latter are pivoted to the outer ends of the links 8 and are provided with overhanging flanges 14 which bear on the upper edges of the links. The rear ends of the pivoted brackets 12 are provided with stops 15 which are designed to extend beneath the shoulders 7 of fixed arms 5. By this means, when the spreader is in operative position the links 8 will parallel the fixed arms 5 and brackets 12 will form continuations of the latter. In lowering the spreader into position, which may readily be done by hand, the pivoted brackets are guided by curved projections 16 secured to the rear ends of arms 5. A short distance above the spreader is a divider 18, which I have shown in the form of a rod paralleling the upper edge of the spreader, the ends of such rod being angularly disposed and connected to the spreader.

The spreader normally occupies a position in the rear of the feeder and as the fertilizer is fed from the distributer the divider 18 will insure initial separation at the center where the packed manure is more solid. When it is desired to cover but a narrow strip the spreader may readily be lifted from operative position, the links 8 swinging on arms 5 and brackets 12 turning on the links, which latter are moved beyond the center of gravity. The spreader may rest upon any suitable cross piece such as a part of the rake. When in this position the spreader will not in any way interfere with the ordinary operation of the distributer.

I claim as my invention:

1. In combination with a fertilizer distributer, a spreader designed to normally lie in rear of the distributer, members pivotally connecting said spreader to said distributer, permitting the former to occupy either a lowered or raised position, arms extending from the distributer with which said members engage for holding the spreader in its lowered position, and a stop for the spreader when raised into its inoperative position.

2. In combination with a fertilizer distributer, a spreader, arms on said distributer for supporting said spreader, members secured to the spreader and designed to engage said arms for normally holding the spreader in operative relation to the distributer, and links pivotally connecting said members to said arms.

3. In combination with a fertilizer distributer, a spreader, means connecting the spreader to the distributer comprising links, brackets pivoted to said links, arms mounted on the spreader connected to said brackets, and fixed arms mounted on the distributer having stops upon which said links are designed to rest, said brackets being designed to engage said arms when the spreader is in its operative position.

4. In combination with a fertilizer distributer, a spreader, means connecting the spreader to the distributer comprising links, brackets pivoted to said links, arms mounted on the spreader connected to said brackets, said brackets having projections on their under sides and rearwardly projecting arms fixed to the distributer having laterally projecting stops and shoulders on their under sides, said links being designed to rest on said stops and said projections of the brackets being designed to engage said shoulders when the spreader is in its operative position.

5. A spreader attachment for fertilizer distributers comprising links for securing the attachment to a distributer, brackets on the rear ends of said links, a spreader, arms secured to said spreader and to said brackets, and means for supporting said spreader in either operative or inoperative positions.

In testimony whereof, I have signed this specification in the presence of two subscribing witnesses.

FREDERICK M. GIBBS.

Witnesses:
CHARLES H. SLOAN,
CHARLIE E. SIEG.